C. L. REMPES.
TIRE.
APPLICATION FILED AUG. 16, 1910.
1,005,470.  Patented Oct. 10, 1911.
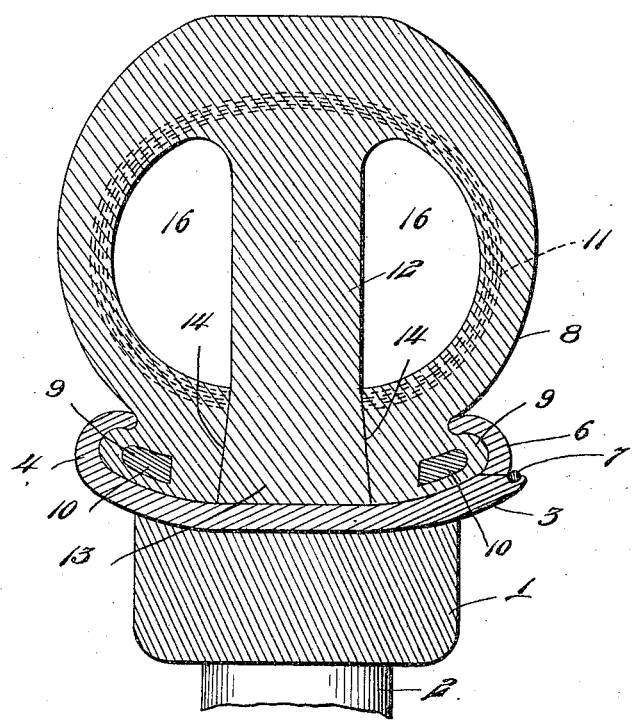
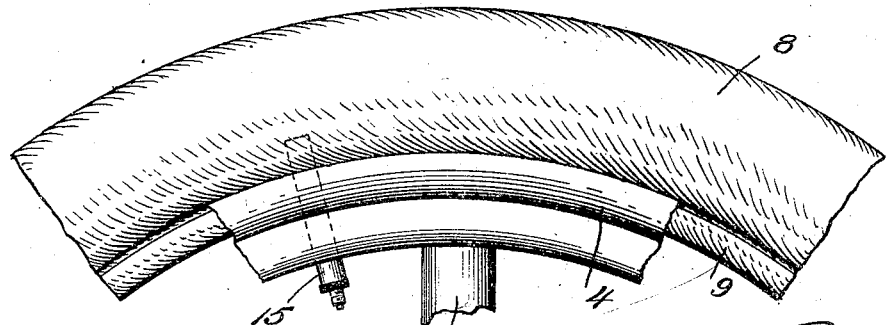
Witnesses  Inventor

UNITED STATES PATENT OFFICE.

CHARLES L. REMPES, OF AKRON, OHIO.

TIRE.

1,005,470.

Specification of Letters Patent. Patented Oct. 10, 1911.

Application filed August 16, 1910. Serial No. 577,468.

*To all whom it may concern:*

Be it known that, I, CHARLES L. REMPES, a citizen of the United States, residing at Akron, in the county of Summit and State of Ohio, have invented certain new and useful Improvements in Tires, of which the following is a specification.

My invention relates to improvements in tires, and has particular reference to that type of tires known as cushion tires, as distinguished from pneumatic and solid tires.

The leading object of my invention is the provision of a tire of the cushion type which can be readily manufactured and which when assembled shall have a plurality of air compartments therein.

The further object of the invention is the provision of a tire which shall be an improvement on that form shown in my patent of July 21, 1908, #893,655.

To attain the desired objects my tire comprises an outer casing of the ordinary clencher type, said tire having an inwardly projecting annular rib or flange bearing against the rim of the wheel and clampingly engaged by the edges of the tire when in position, the invention further residing in the novel features of construction and combination and arrangement of parts for service substantially as described and as illustrated in the accompanying drawing.

Figure 1 represents a cross-sectional view of my tire in position, and, Fig. 2 represents a fragmentary side elevation thereof.

In the drawings, in which similar characters of reference are employed to denote corresponding parts in the several views, the numeral 1 designates the felly of the wheel, held in position by the usual spokes 2, while secured to the felly is the clencher rim 3 having the clencher flange 4 at one edge and the annular groove 5 formed in the other edge, while received on the latter edge is the clencher ring 6 for engaging the tire, there being a clamping ring 7 engaged in and projecting upward from the groove 5 for securing the clencher ring 6 in position.

Mounted on the rim 3 is my tire proper 8 having at the outer portion of its edges the annular projections or ears 9 adapted to be engaged by the flange and ring 6, the tire being provided with the customary reinforcing members 10 adjacent the ears.

Extending around the tire are the web reinforcing members 11 which extend from edge to edge laterally of the tire, while molded integral with the tire within said reinforcement is the inwardly projecting rib 12 having the flaring end 13, said rib being of soft spongy rubber which will present a yielding resistance and have great endurance without breaking or hardening. By reference to Fig. 1 it will be observed that when the tire is mounted on the rim 3 the end 13 of the rib is engaged between the slightly inclined edges 14 of the casing section and makes a tight dove-tail joint therewith, the sections or edges of the tire being pressed against the rib by the clamping ring with sufficient force to cause said edges to clampingly engage and make an air tight joint with the rib, the end of the rib resting upon and being supported in position by the rim 3.

From the foregoing description taken in connection with the drawings the construction and advantages of my tire will be readily understood, and it will be seen that I have provided a tire having a durable outer casing having interior air chambers for holding the tire casing outward against pressure on the exterior thereof, said tire being further provided with an integral rib of spongy or yielding rubber for aiding in retaining the tread portion of the casing in position, said rib bearing against the clencher rim and being clampingly engaged by the edges of the casing or tire proper.

It will be further understood that if desired my tire may be provided with valves 15 as shown in Fig. 2, said valves being adapted to introduce air into the spaces 16 to cause the same to form a pneumatic tire which on account of the thickness of the casing will be practically un-puncturable, this quality of the tire being further enhanced by the position of the center rib which prevents any except lateral punctures, material such as glass cutting through the tread proper being merely harmlessly embedded in the rib portion.

It will thus be seen that I may provide a tire which while normally of pneumatic type will practically obviate all tire trouble due to punctures, in that if the casing is punctured the reinforcing rib will serve to hold the casing outward from the rim and provide a cushion tire of the highest efficiency.

If desired, a coating of cement may be spread on both sides of the end 13 of the rib to cement or secure the same to the edges of the casing.

I claim:

1. In a tire, the combination with an outer casing provided with annular ears and having inclined edges, of an integrally formed rib extending inward from the casing and having a flaring end adapted to be engaged between the inclined edges of the casing.

2. A tire, consisting of a main casing, provided with annular laterally disposed ears adapted to be engaged by the rim and having its opposing ends formed with clamping faces and a rib formed integral with the main casing and depending from said casing and having its lower end broadened or enlarged and formed with a broad flat lower face resting against the rim and its enlarged side faces contiguous to said end clampingly engaged by the said opposing clamping faces of the main casing.

In testimony whereof I affix my signature, in presence of two witnesses.

CHARLES L. REMPES.

Witnesses:
E. D. COATES,
PHILIP B. TREASH.

Copies of this patent may be obtained for five cents each, by addressing the "Commissioner of Patents, Washington, D. C."